United States Patent [19]

Klinner

[11] Patent Number: 4,502,267
[45] Date of Patent: Mar. 5, 1985

[54] CROP ENGAGING APPARATUS AND METHODS

[75] Inventor: Wilfred E. Klinner, Milton Keynes, England

[73] Assignee: National Research Development Corporation, London, England

[21] Appl. No.: 369,013

[22] PCT Filed: Aug. 6, 1981

[86] PCT No.: PCT/GB81/00158
§ 371 Date: Apr. 9, 1982
§ 102(e) Date: Apr. 9, 1982

[87] PCT Pub. No.: WO82/00564
PCT Pub. Date: Mar. 4, 1982

[30] Foreign Application Priority Data

Aug. 14, 1980 [GB] United Kingdom ............... 8026481
Aug. 14, 1980 [GB] United Kingdom ............... 8026526

[51] Int. Cl.³ .................. A01D 55/18; A01D 82/00
[52] U.S. Cl. ............................ 56/13.6; 56/DIG. 1; 56/16.4; 56/192
[58] Field of Search .................. 56/13.6, 13.7, 14.1, 56/192, 157, 503, DIG. 1, 14.5, 16.4, 295, 372, 370, 364; 198/513, 518

[56] References Cited

U.S. PATENT DOCUMENTS 2,625,784  1/1953  Kelsey .
2,748,552  6/1956  Pool et al. .......................... 56/157
3,608,287  9/1971  Gaertner .
3,654,750  4/1972  Van Der Lely .
4,203,277  5/1980  Kaetzel ............................... 56/370

FOREIGN PATENT DOCUMENTS 1803807   3/1970  Fed. Rep. of Germany ........ 56/192
1582249   7/1970  Fed. Rep. of Germany .
1936054   1/1971  Fed. Rep. of Germany ........ 56/192
1507154  11/1973  Fed. Rep. of Germany .
2827786   1/1980  Fed. Rep. of Germany ....... 56/13.6
1500062   6/1966  France .
1578285   8/1969  France .
2403010   4/1979  France .
2454748  11/1980  France .
7004883   4/1970  Netherlands .
 445930   3/1968  Switzerland ..................... 56/13.6
1188358   4/1970  United Kingdom .............. 56/13.7
1188359   4/1970  United Kingdom .
1424511   2/1976  United Kingdom .............. 56/13.6

Primary Examiner—Robert Peshock
Assistant Examiner—John G. Weiss
Attorney, Agent, or Firm—Cushman, Darby & Cushman

[57] ABSTRACT

A crop cutting and conditioning apparatus has two vertical axis rotary drum cutters 13, each having an upper rotor with a crop conveying surface 19 and a lower rotor carrying knives 21. Gears drive the upper and lower rotors at different peripheral velocities. The lower rotor has an annular rim 18 having an upper surface shaped to continue the outline of the conveying surface 19. The knives 21 protrude outwardly from beneath the rim 18 and rotate with the rim. The upper rotor has conditioning elements comprising brushes 35 (or sheets of plastics material), for conveying crop and conditioning crop by relative movement between the brushes and the crop. The outer tips of the brushes 35 (or the edges of the sheet or rib-like elements) lie along one or more helical or part helical paths around the rotor axis. Preferably the lower end of each helix leads during the rotation so as to exert a lifting action on crop engaged by the rotors.

23 Claims, 19 Drawing Figures

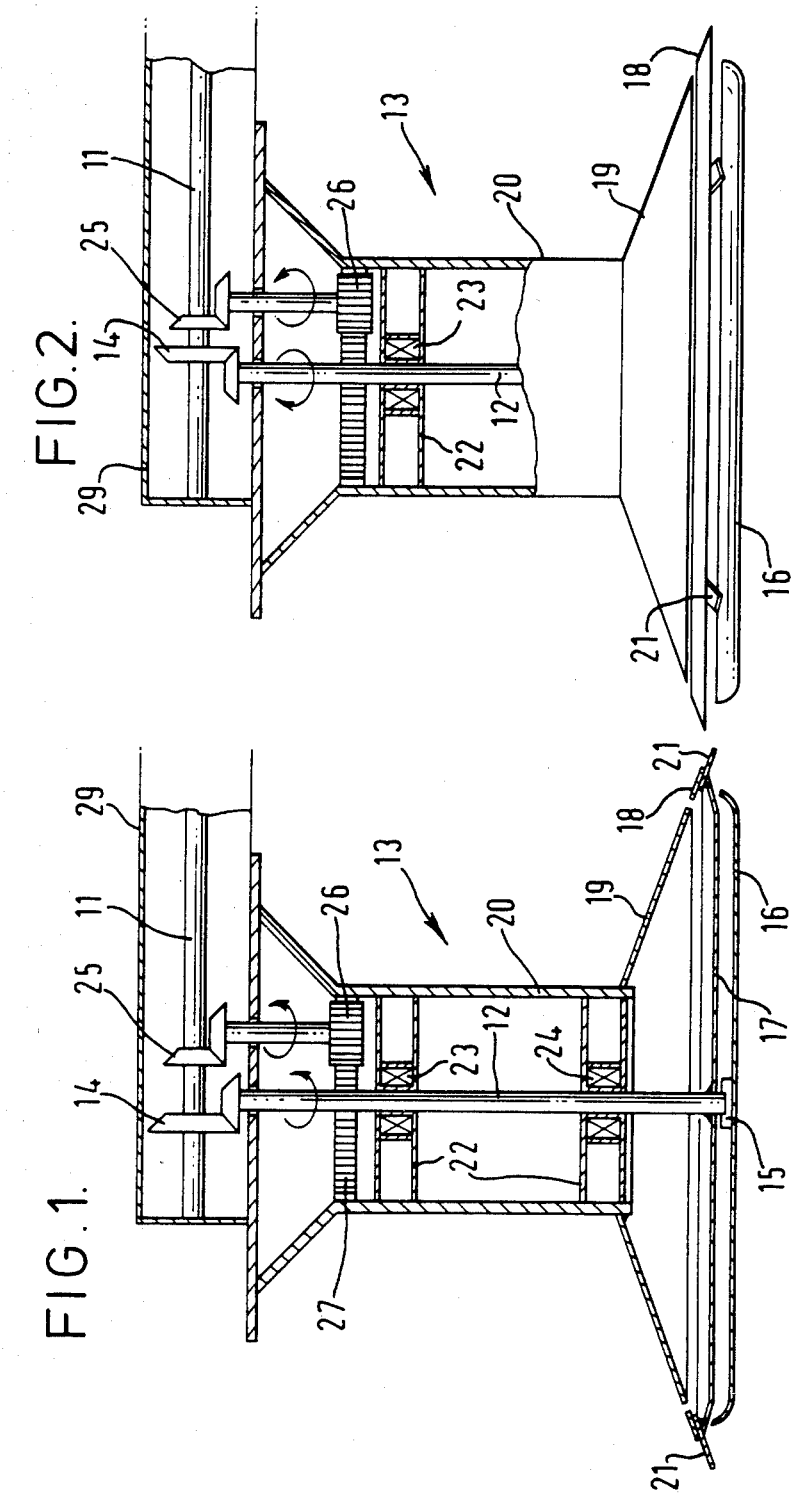

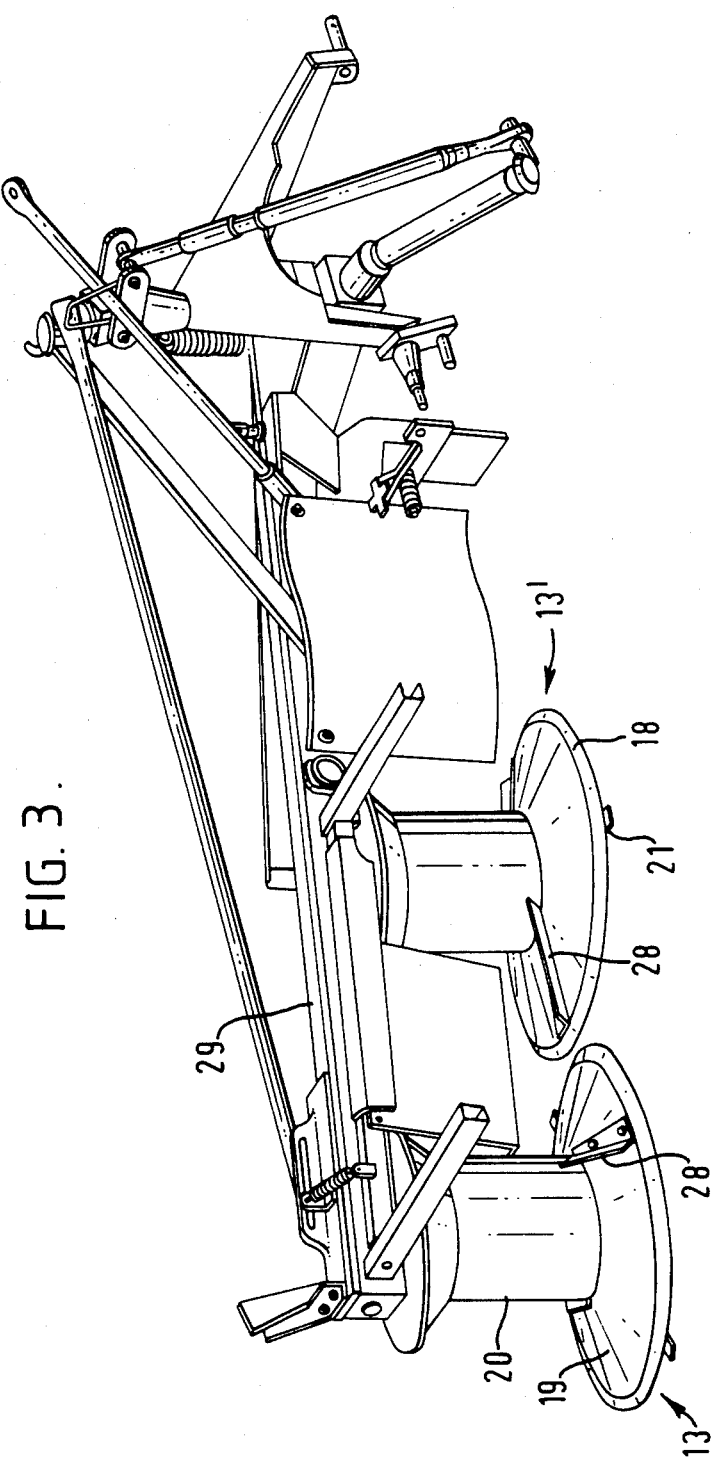

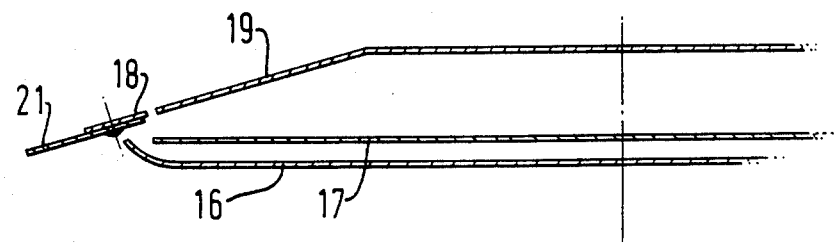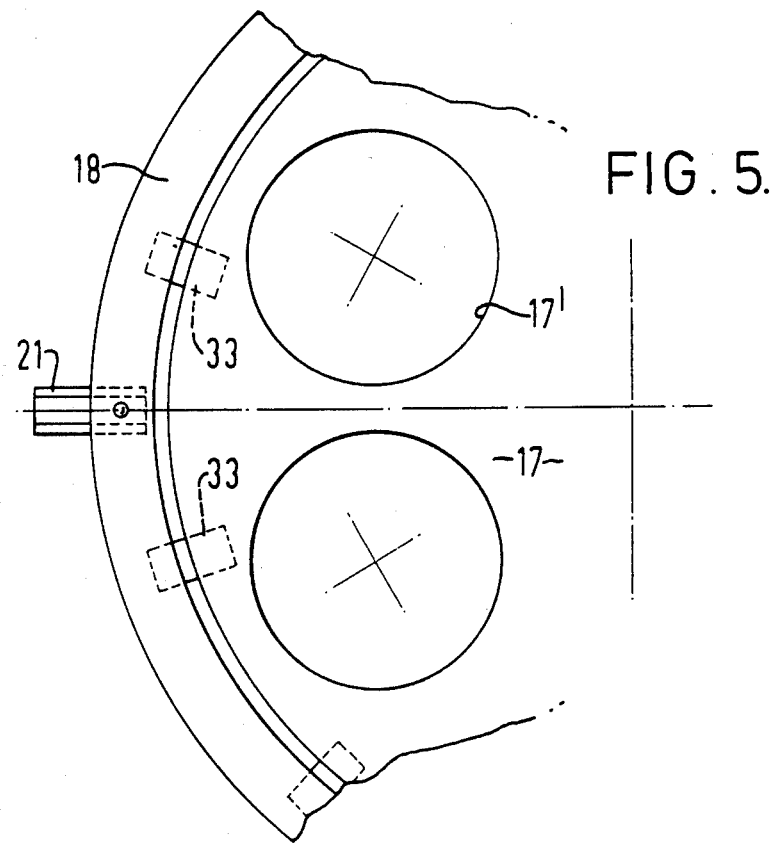

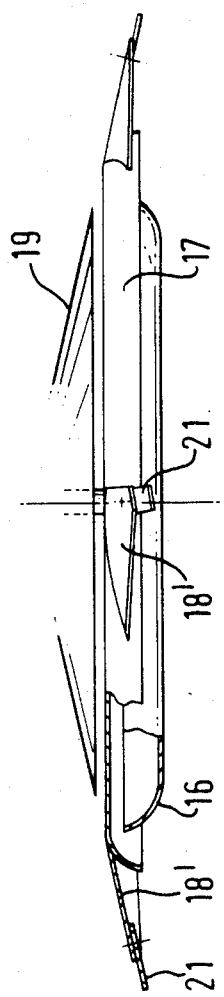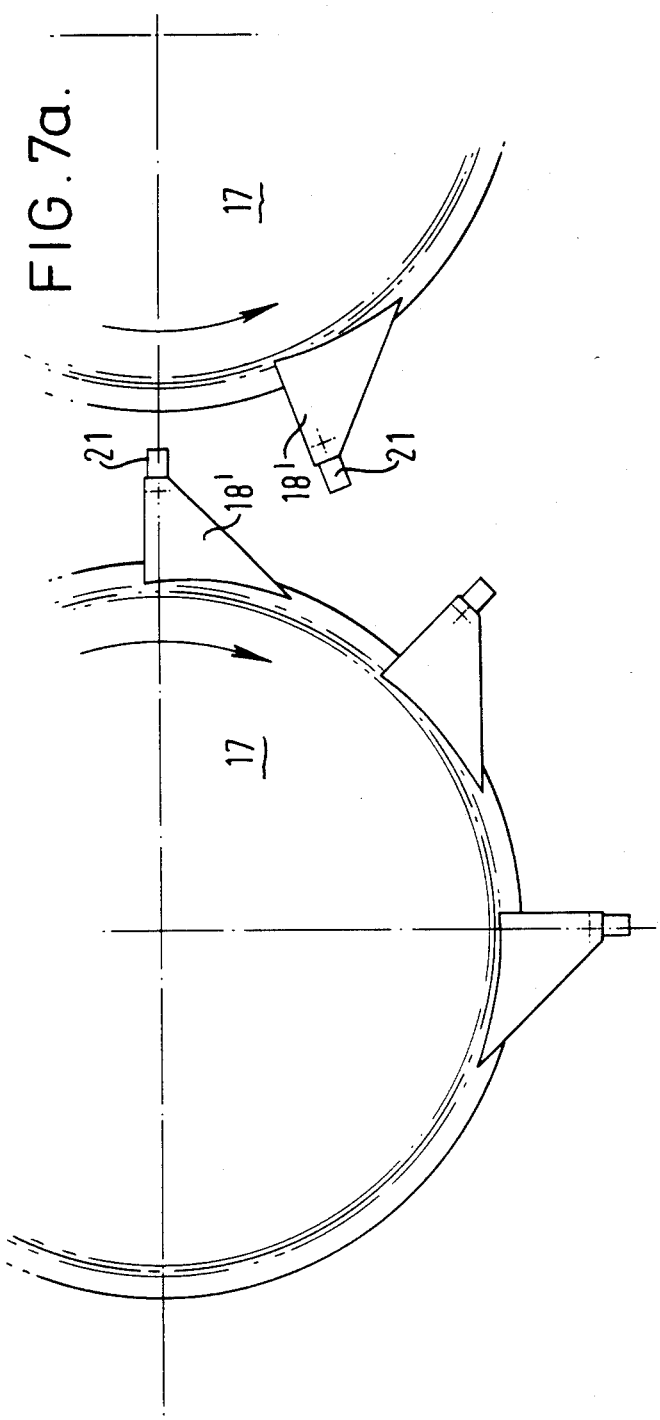

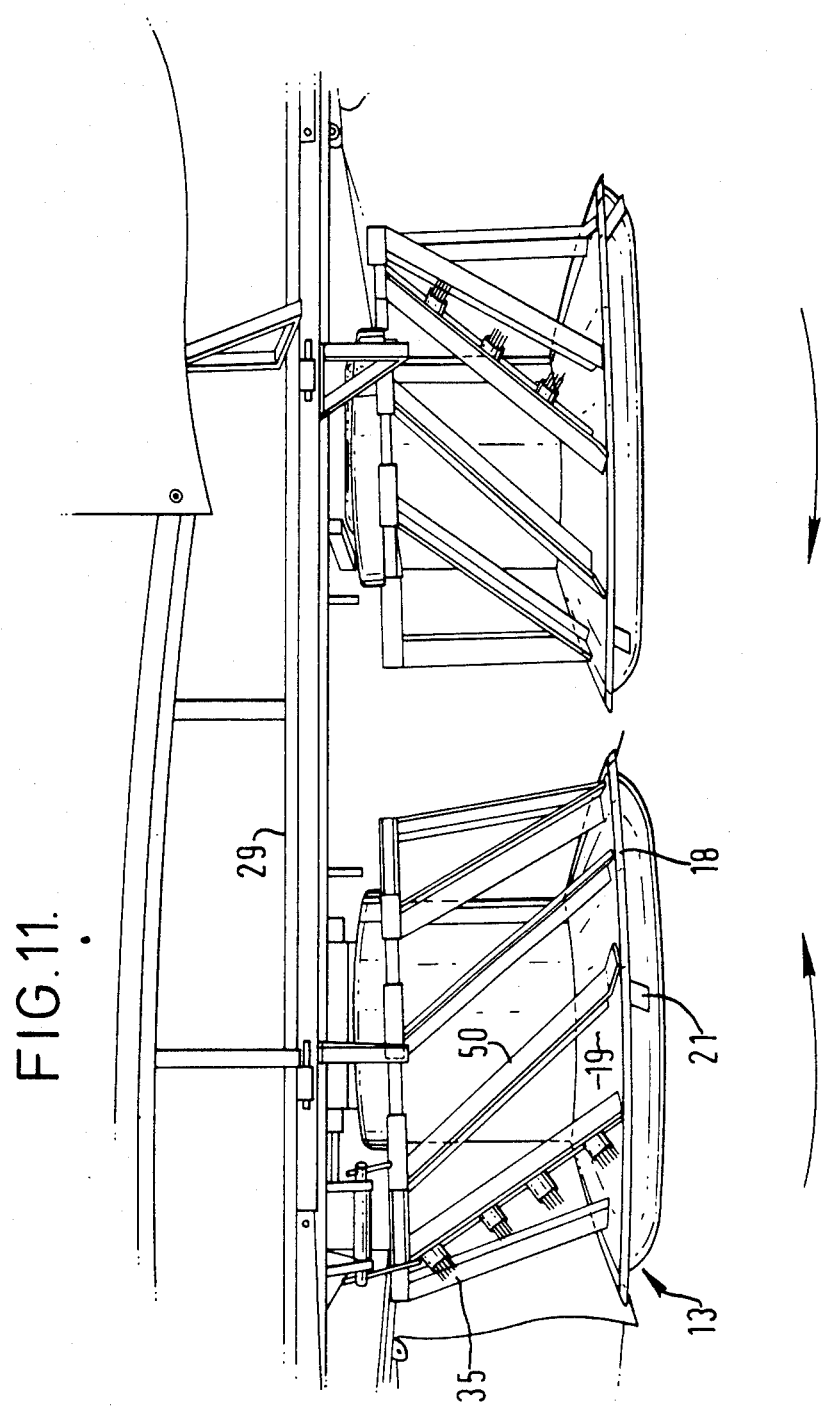

CROP ENGAGING APPARATUS AND METHODS

The present invention relates to crop engaging apparatus for conveying and/or treating crops especially, but not exclusively, grasses, and is concerned in some respects with apparatus for cutting, conditioning and conveying crop. The invention also relates to corresponding methods.

Modern crop cutting devices are usually mowers of the rotary type which sever the crop by impact, using free swinging knives attached near the periphery of discs which may be used alone (disc mowers), or which may form lower skirts of vertical drums which assist in conveying the cut crop towards the rear of the machine (drum mowers). In each case the discs which support the knives serve to convey the cut crop to the rear. Knife tip speeds have to be in the broad range of 70 to 90 meters per second, to ensure clean cutting in most crops and conditions, where impact is used. At these speeds it has been found that the power requirement for conveying the crop by the discs is very considerable. In some aspects the invention is concerned with reducing the power requirement for cutting the crop and/or for conveying the cut crop.

In some aspects the present invention is concerned with improved arrangements of combinations of crop conditioning devices with crop cutting devices. Such a device is shown in a previously published U.S. Pat. No. 3,977,165 (Klinner et al) which shows a form of drum cutter in which the main upper rotor is driven at a different rate of rotation from a lower rotor which carries the cutting knives of the cutting device. In this arrangement, conditioning devices are provided on the upper surface of the crop conveying skirt of the upper drum rotor which is rotated at a different rate of rotation from the cutting knives. In practice a problem arises with such arrangement in that it is difficult to maintain the correct close vertical clearance of the two rotary components, especially when the disc diameter is large and foreign objects are present on the surface of the field. In some aspects the present invention seeks to provide a rotary cutting apparatus of an improved and simplified nature having regard to the drum cutters described in this U.S. patent specification.

In other aspects, the present invention is directed towards means for conditioning crops. Forage crops such as grasses which are surplus to immediate requirements are usually cut and field-dried to provide animal fodder, particularly hay or silage, for the feeding of animals when fresh forage crops are not available. In temperate, especially maritime climates, the crops are at risk between cutting and harvesting (i.e. the field exposure time) because the adverse effects of light and rain and micro-organism activity can produce appreciable nutrient and dry matter losses. Accordingly, it is important to minimize the field exposure time to reduce the risk of such losses. However, the crops cannot be harvested until they have dried to a sufficiently high dry matter content for safe storage as animal fodder. In the case of hay, a dry matter content of about 80% is usually required.

The speed at which surface and sap moisture evaporate from the cut crop during field exposure depends inter alia on the physical condition of the crop. The principal barrier to moisture loss is the cuticle and the layer of epicuticular wax on the crop surface, and it is now common practice in agriculture to mechanically treat the crop in order to damage this barrier. Such mechanical treatment, which may take the form of crushing, lacerating, bruising, splitting, bending or scuffing the stem and leaves of the crop, is known as "conditioning". A variety of conditioning devices have been used or proposed, for example as in UK Pat. Nos. 588439 (Chilton), 662303 (Goodall), 1303970 (Bucher Guyer), U.S. Pat. No. 3,977,165 (Klinner et al) and PCT published application No. PCT/GB79/00053—publication No. WO 79/00863 (BSRAE). The earlier of the devices described in these publications would often cause undesirable deep tissue damage to the crop resulting in high dry matter and nutrient losses, and were also unsatisfactory when attempts were made to condition a wide swath of crop, as the complexity and weight of machines increased considerably with width. The form of conditioning described in the last of the specifications set out above has allowed considerable progress to be made in producing acceptable conditioning with a light and relatively inexpensive conditioning device, and the present invention is concerned in some aspects, although not exclusively, with improvements in relation to the form of conditioning described and claimed in the said PCT patent application.

Another factor which affects the amount of time the crop lies in the field after cutting is the number of passes required to cut and condition the crop. In some cases the crop requires three or more passes, including cutting, conditioning the crop after it has fallen to the ground, and finally tedding to restructure the swath so that it maintains a fast drying rate. Many proposals have been made in the past for reducing the number of passes by combining cutting and conditioning in a single machine, such combined machines are described, inter alia, in the PCT application numbered above. In another aspect, the present invention is particularly concerned, although not exclusively, with apparatus for carrying out in a single pass the cutting and conditioning operation. In this connection the present invention is concerned in its main aspects with cutting and/or conditioning crop by rotary movement about a vertical axis. Such cutting and conditioning by rotary movement about a vertical axis is known in itself, for example in the UK Pat. No. 1303970 (Bucher Guyer), U.S. Pat. No. 3,977,165 (Klinner et al) and PCT application No. PCT/GB79/00053 (BSRAE) mentioned above. In the UK Specification No. 1303970 (Bucher Guyer) the conditioning rotor is described, inter alia, as a vertical "squirrel-cage" type of rotor rotating behind a vertical axis drum mower, whereas in the U.S. Pat. No. 3,977,165 (Klinner) the conditioning devices are described as conditioning elements mounted on the upper surface of the crop conveying skirt of a vertical axis drum mower. The PCT application No. PCT/GB79/00053 (BSRAE) mentions the possibility of two counter-rotated brushes fitted vertically so as to cover the opening between the drum of two-drum mowers to give a simple swath-forming arrangement. The brushes are described as being cylindrical or conical.

There have also been known previously a number of forms of crop conveying rotors having outwardly directed crop conveying elements. One form of such crop conveying elements has been provided by rotors generally in the form of paddle wheels with flat sheet like conveying elements extending longitudinally along the length of the conveying rotor. Such paddles were sometimes straight edge, and sometimes shaped with serrations or other patterns. Examples of previous disclosures of such rotors are to be found in U.S. Pat. No. 3,676,988 (Bucher-Guyer) which shows in FIG. 9 a horizontal conditioning rotor provided with beater bars 4b formed with saw-teeth shaping. Another prior patent, UK Pat. No. 1140284 (Landbruksteknisk) shows in FIG. 2 at 15 a feed roller the free edges of which are said to be preferably waved or saw-toothed. Also in UK Pat. No. 1214840 (Vissers) there is disclosed a paddle wheel type of conveying rotor which it is said may be made of sheet metal or of synthetic plastics material, rubber or like flexible elastic material.

As has been mentioned, our own previously published UK pending Patent Application No. 8012426 shows pick-up and conveying rotors including outwardly directed crop engaging elements, which may be formed of synthetic plastics material.

In our prior granted UK Pat. No. 1322165, before amendment, there is disclosed in FIGS. 1 to 3 a crop conditioning device in which a rotor has a number of outwardly directed conditioning elements formed of lengths of rubber regularly disposed about the axis of the rotor.

According to the present invention there is provided crop engaging apparatus comprising a mobile frame for movement over the ground, one or more crop engaging rotors for conveying and/or treating cut crop, and drive means for rotating the or each rotor about a vertical axis, or near vertical axis, for conveying cut crop towards the rear of the machine, in which the or each rotor has one or more crop engaging elements arranged with an edge or edges thereof, or with an array of distal ends thereof, lying along one or more helical or part helical paths around the rotor axis, the helical or part helical paths being arranged with the lower end of the or each helix leading so as to exert a lifting action on crop engaged by the rotor.

In one preferred form, the or each rotor has a plurality of crop engaging elements distributed around the axis of the rotor, each element comprising a generally flat sheet or rib-like member having an outwardly facing edge for engaging crop.

Conveniently the crop engaging elements are formed by a plurality of wide, generally flat rib-like members spaced from and distributed around the axis of the rotor, each rib-like member having a general longitudinal axis which is inclined at a skew angle to the axis of the rotor, and in one form each rib-like member has a generally crescent-shaped form, the outer edge of the rib being of curved shape.

It is to be appreciated that the helix need not be formed by curved outer edges of the elements, in that the outer edges may be straight, but may merely be arranged to provide the overall effect of a helix. However it is convenient in some arrangements for the outer edges to be curved.

The invention in this aspect finds particular application where the crop engaging elements are formed of thick stiff resilient and generally flat material (for example thick stiff resilient sheet-like material), conveniently of synthetic plastics material. Suitable materials for the crop engaging elements are, for example, polyethylene, nylon, and polypropylene.

The shape of each such crop engaging element may vary between a rib-like member with a longitudinal edge engaging the crop, and an outwardly directed fin having a length in the said outwardly extending direction greater than its width.

In accordance with another preferred form of the invention, the rotor comprises a brush-like structure having a multiplicity of stiff, resilient, outwardly directed, elongate elements for picking up and conveying the crop by an action including relative movement between the conveying elements and the crop engaged thereby, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements. Most preferably, in this form, the elements are arranged in spaced-apart tufts of elements.

Where reference is made to the elements being sufficiently stiff to return to their undeflected dispositions at least predominantly by virtue of the stiffness of the elements, it is to be appreciated that the base of an element may be secured to a support member by a mounting which has itself a degree of resilience, for example by being clamped to a support member by clamping means including resilient material. Such a resilient mounting may contribute to the return of an element to its undeflected disposition, but it is a feature that the elements are sufficiently stiff to return to their undeflected dispositions predominantly by virtue of the stiffness of the elements. Where, the elements are mounted in tufts with a plurality of elements set closely together, it will be appreciated that adjacent elements will assist each other in the return to an undeflected disposition when free from engagement with crop, but again it will be appreciated that this return is effected predominantly by virtue of the stiffness of the elements. Similarly the return of the elements to their undeflected dispositions may be assisted by the effects of centrifugal force, but again the elements are returned predominantly by virtue of the stiffness of the elements.

Conveniently the elements may be arranged in a brush of conventional form, that is to say in which groups of elements are mounted together in tufts, and the positions of the tips of the elements are to at least some extent random. However other forms of brush will be readily apparent, and in particular the brush may comprise elements which are disposed in a regular, non-random, pattern.

It is preferred that the elements are sufficiently stiff to penetrate a stream of crop being conveyed and to convey the crop with a degree of slippage between the elements and the crop. It is further preferred that the elements are yieldable by bending substantially along the whole of the free lengths thereof.

In one form, the elements may be arranged in spaced apart tufts of elements and the population of the elements in each tuft at the tips may lie in the range 1 to 20 elements per sq. cm, preferably in the range 3 to 16 elements per sq. cm.

Conveniently each tuft may be formed of one or more lengths of element material doubled over and secured within a protective, resilient retaining sleeve or tube to a supporting base in the region of the fold of the doubled over element length or lengths.

Conveniently each element or group of elements in a tuft may be supported and protected at the base thereof by a sleeve of resilient material.

In general terms, the conditioning elements may be of the form described in the published P.C.T. patent application No. PCT/GB79/00053.

In accordance with another feature of the present invention there is provided in association with the or each crop engaging rotor, a rotary cutting means mounted for rotation about the same axis as the crop engaging rotor, and arranged to be driven by the drive means for cutting crop by rotary motion during movement of the frame over the ground, the associated crop engaging rotor being arranged to lift and convey rearwardly crop cut by the cutting means. In a preferred form the drive means is arranged to drive the or each rotary cutting means at a different angular velocity from its associated crop engaging rotor. In some cases where a rotary cutting means is provided it is advantageous to arrange that the crop engaging elements of the rotor extend outwardly beyond the outer perimeter of the cutting path of the cutting means.

By the term different angular velocities is meant that the first and second rotors of each cutting device are rotated with different angular rates of rotation and/or in different directions of rotation.

In preferred arrangements of the present invention, it is possible to provide rotary mowers on which the cutting knives are driven at the optimum speed for impact cutting, i.e. between approximately 70 and 95 m/s, but the crop conveying rotors are driven at a very much lower speed, so that conveying and conditioning devices attached to them will neither fragment the crop excessively nor propel foreign objects dangerously.

Although embodiments of the invention may be constructed in which only a single crop engaging rotor is provided, there will normally be provided two or more crop engaging rotors positioned side by side relative to the direction of forward travel of the apparatus. In particularly preferred forms, there is provided a pair of crop engaging rotors, each rotor being mounted for rotation about a vertical or near vertical axis with the vertical axes spaced apart transversely relative to an intended direction of forward travel of the apparatus, and the drive means being arranged to drive the rotors in counter rotation in such a manner that crop is passed between the rotors upwardly and rearwardly from the front to the rear of the apparatus. In such a case the rotors have oppositely wound helixes, and are rotated in opposite directions, so that cut crop is drawn upwardly and rearwardly through the gap between the rotors.

Where there are provided cutting means in association with the crop engaging rotor or rotors, the said axis or axes about which the rotor or rotors are rotated will normally be vertical, that is to say vertical when the apparatus is standing on horizontal ground. Where the crop engaging rotor or rotors are used without associated cutting means, the axis or axes of rotation may be inclined to the vertical, for example at an angle of up to 25° from the vertical.

In accordance with another preferred feature, where a pair of rotors are positioned side by side, there may be provided apparatus in which the outer peripheries of the two crop engaging rotors overlap, in which the drive means is arranged to rotate the two crop engaging rotors in counter rotation at the same rate of rotation, and in which the crop engaging elements are so arranged that in operation elements of one rotor intermesh with spaces between elements on the other rotor during rotation.

In accordance with another arrangement, apparatus may be provided where a pair of rotors are positioned side by side, and are driven to rotate in the same directions of rotation, that is to say not intermeshing.

With no cutting means present this leads to crop being swept across the combined front of the rotors into a windrow on one or other side of the machine, depending on the direction of rotation.

There is also provided in accordance with the invention a method of conveying crop comprising the steps of rotating about a vertical or near vertical axis a crop engaging rotor mounted on a mobile frame for movement over the ground, and conveying crop towards the rear of the frame by rotation of the rotor, the conveying step including conveying the crop rearwardly by movement of the periphery of the rotor, and lifting the crop by an augering action of the rotor.

The invention finds particular usefulness where the method includes the steps of cutting crop by rotation of a rotary cutting means mounted coaxially with the crop engaging rotor, and conveying and lifting the cut crop by the conveying and augering action of the crop engaging rotor, particularly when including the step of rotating the rotary cutting means and the crop engaging rotor at different angular velocities.

The invention finds particular advantage where the method includes the steps of rotating two crop engaging rotors about respective vertical or near vertical axes which are spaced apart transversely relative to forward motion of the rotors, rotating the two rotors in counter rotation in such a manner that crop is passed between the rotors upwardly and rearwardly from the front to the rear of the apparatus by a conveying and augering action of both rotors. However it is to be understood that a greater number of rotors may be spaced transversely in line or in open or closed V-formation for treating, scattering or gathering into a windrow, crop from a wide strip of field surface area.

Embodiments of the invention will now be described by way of example with reference to the accompanying drawings in which:

FIG. 1 is a cross-section showing from the front the outer half of a twin unit, two-speed crop cutting apparatus for use in an embodiment of the invention, and generally of the drum mower kind;

FIG. 2 is a front view partly in cross-section of a modified form of the crop cutting apparatus of FIG. 1;

FIG. 3 is a diagrammatic perspective view of the general layout of a crop cutting apparatus for use in an embodiment of the present invention as shown in the preceding Figures;

FIGS. 4 and 5 are side and plan diagrammatic representations respectively of a modification of a crop cutting apparatus of the form shown in the preceding Figures;

Figure 6:
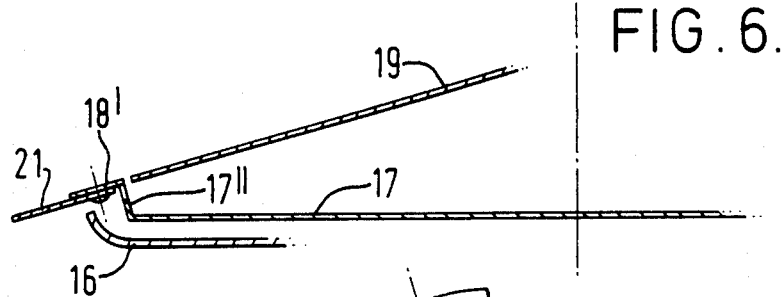
Figure 6A:
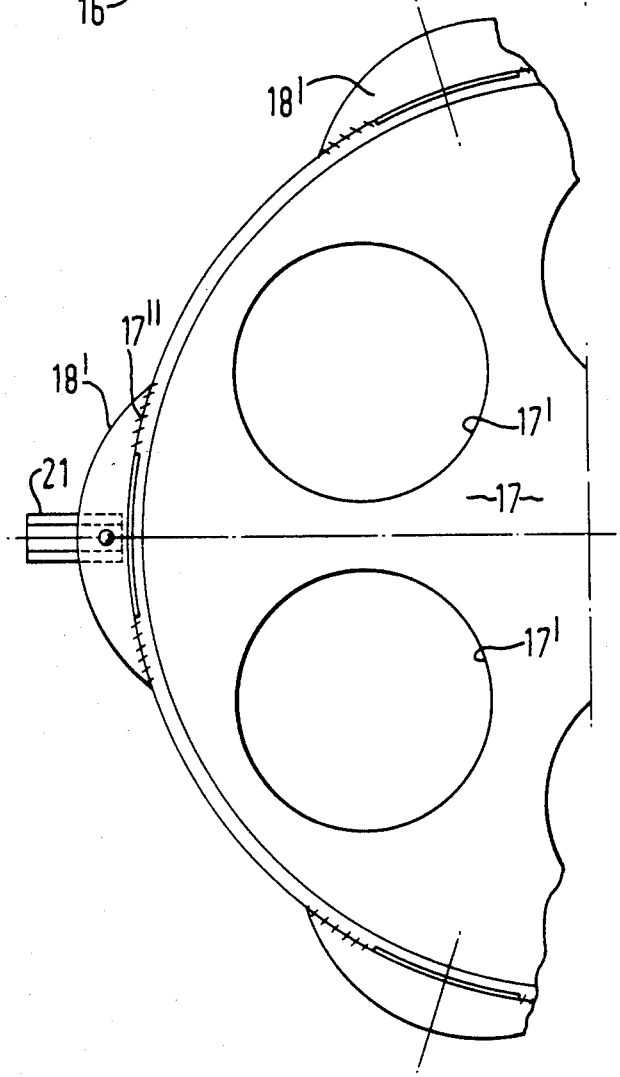
Figure 8:
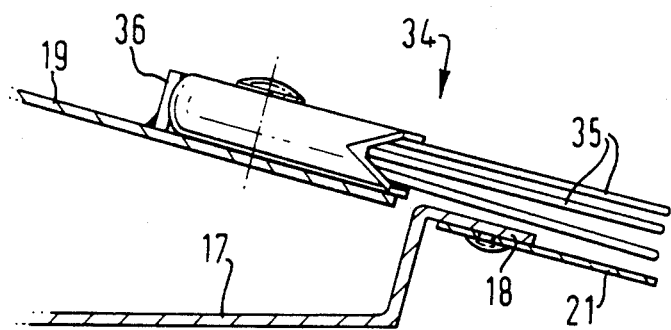
Figure 8A:
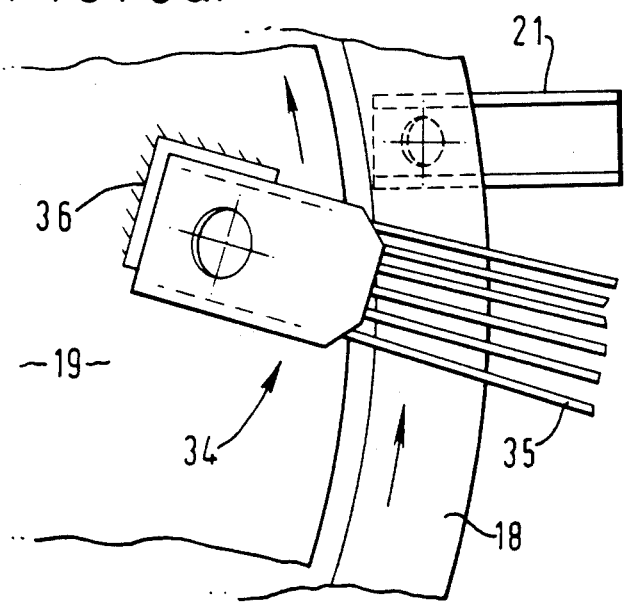
Figure 9:
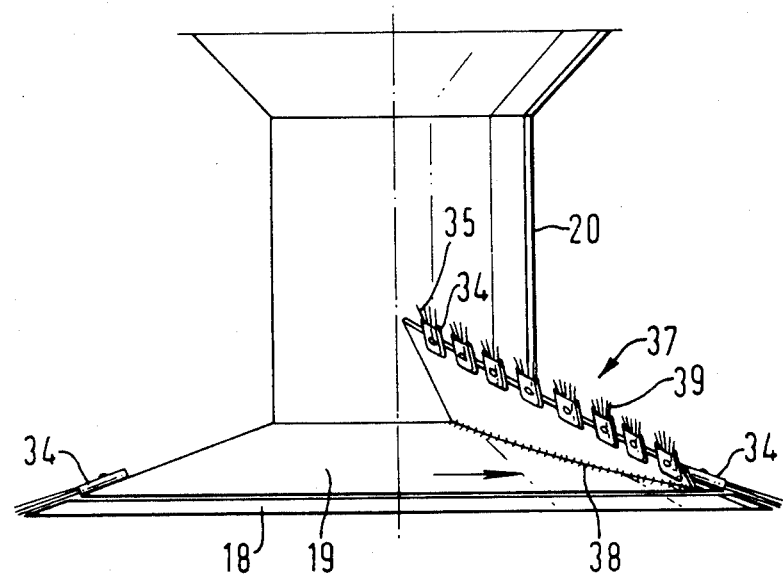
Figure 10:
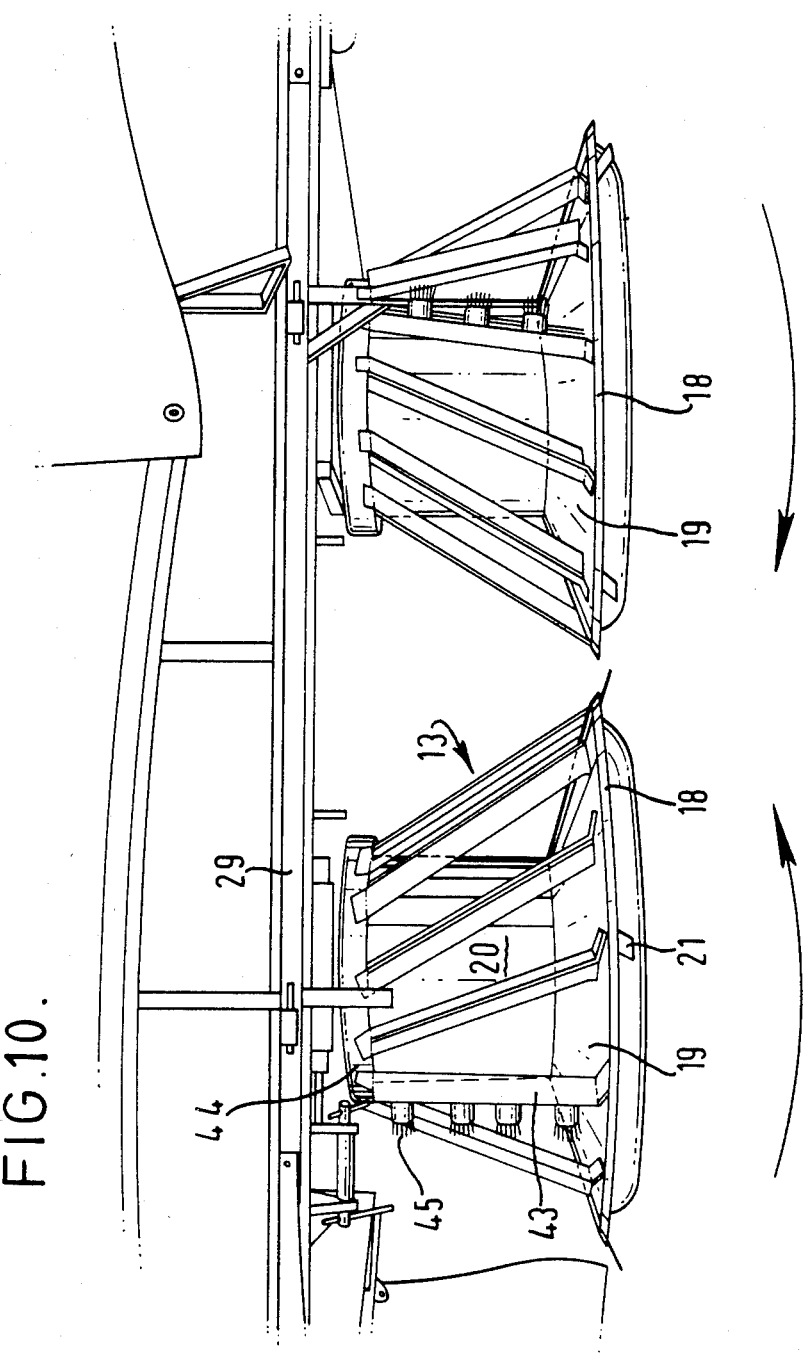
Figure 10A:
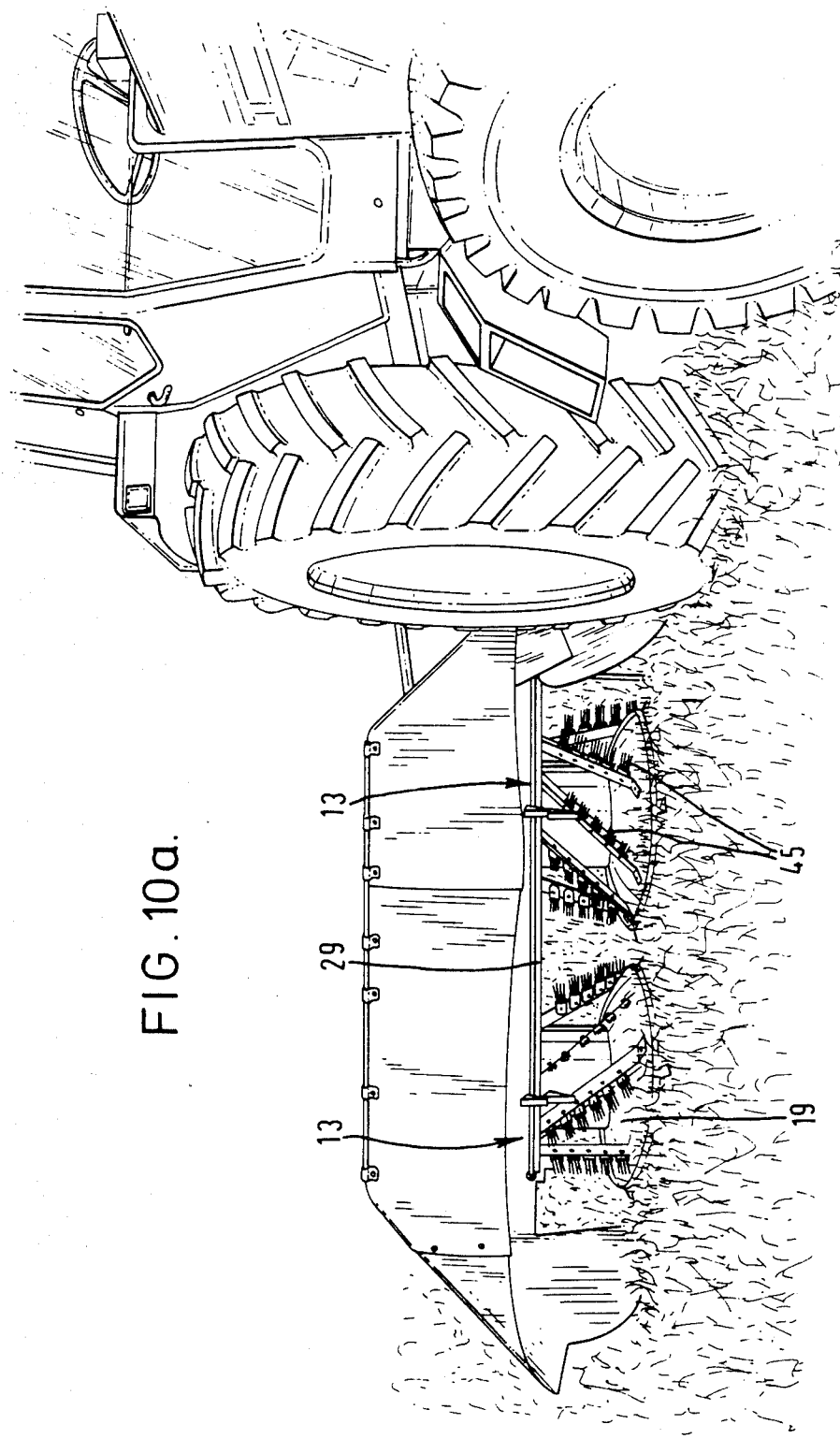
Figure 12:
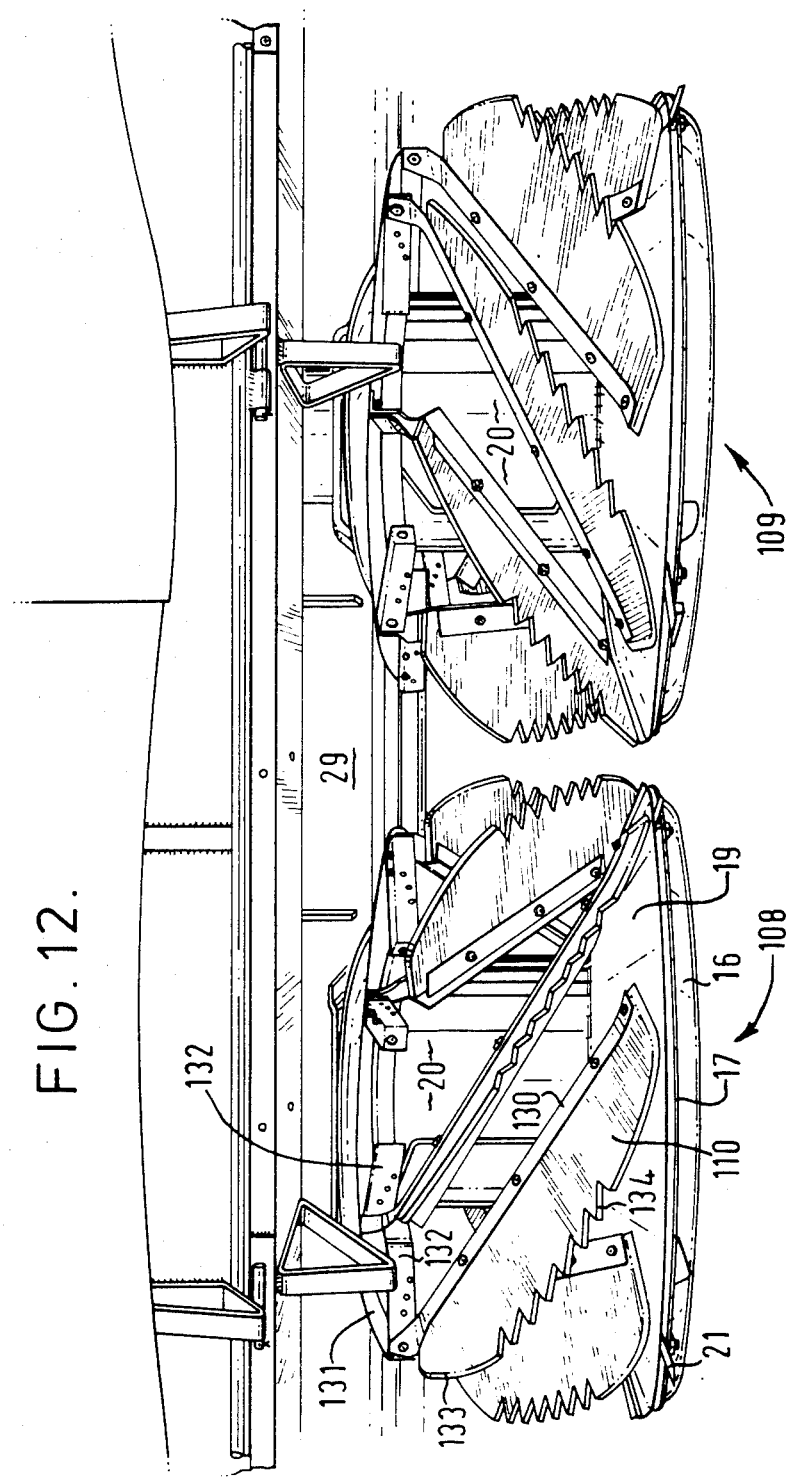
Figure 12A:
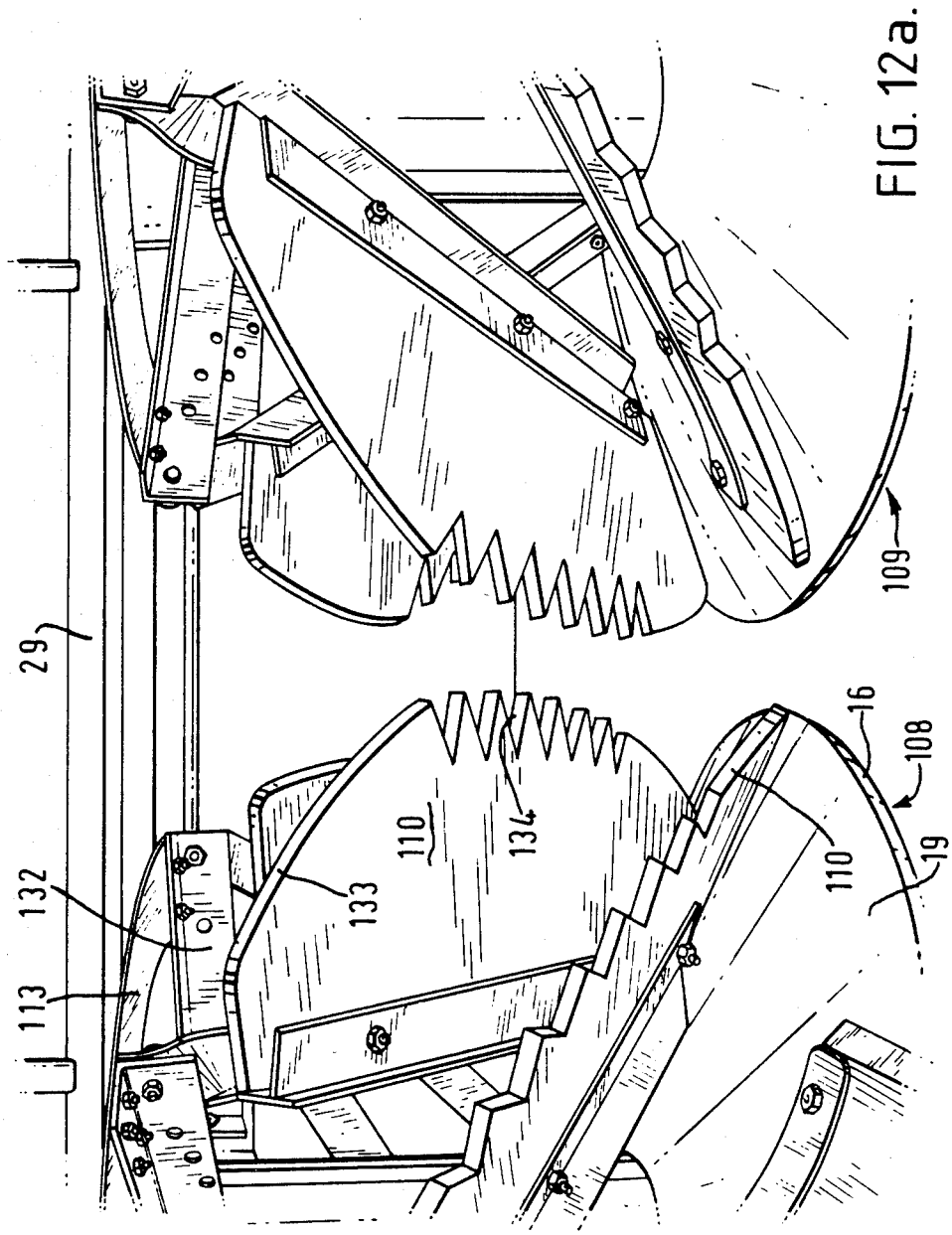

FIGS. 6, and 6(a); 7 and 7(a); and 7(b) and 7(c); are diagrammatic side and plan views respectively of a further modification of the crop cutting apparatus shown in the preceding Figures, in which a lower rotor includes discrete projecting portions;

FIGS. 8 and 8(a) show a side cross-section and plan view respectively of a crop cutting apparatus suitable for use in connection with the crop cutting apparatus shown in the preceding Figures;

FIG. 9 is a diagrammatic side view of crop cutting and conditioning apparatus embodying the invention in which an array of conditioning elements is provided on an upper rotor of a crop cutting device;

FIGS. 10 and 10(a) show diagrammatic perspective views of a crop cutting and conditioning device embodying the invention utilising brush-like conditioning elements;

FIG. 11 shows a diagrammatic perspective view of a modification of the crop cutting and conditioning device shown in FIG. 10; and FIGS. 12 and 12(a) are perspective views of an alternative form of crop cutting and conditioning apparatus embodying the invention and utilising rib-like conditioning elements.

FIG. 1 is a cross-section showing from the front the outer half of a twin unit, two-speed crop cutting apparatus embodying the invention and generally of the drum mower kind. From a transverse drive shaft 11 a cetre spindle 12 of the drum cutter indicated generally at 13 is driven by means of two bevel gears 14. At its base the spindle 12 runs in a thrust bearing 15 and has attached to it a skid disc 16 which is freely rotatable in known manner. Above the skid disc 16 there is fixedly attached to the spindle 12 a support disc 17 which constitutes a first, lower rotor of the cutting device and which carries a narrow frusto-conical rim 18 which may for example be 50 mm wide. The shape of the rim 18 is such that its sloping upper surface is a continuation of the shape of a crop conveying skirt 19 attached to the base of the central drum 20 of the cutting device 13. Pivoted knives 21 are attached to the underside of the narrow rim 18 in such a way that upon meeting an obstruction each knife can swing through 360°. The knife carrying rim 18 is entirely smooth on its crop facing surface and may for example be coated with polytetrafluoroethylene or other durable low friction material. At the position of each knife 21, recesses in the disc 17 allow the knife to pivot underneath the rim 18, through 360°, upon striking and obstruction on the ground.

The drum 20, skirt 19 and internal supporting webs 22 constitute a second, upper rotor which is mounted by bearings 23 and 24 on the central spindle 12, and is driven from the transverse shaft 11 at the top by a second pair of bevel gears 25 and through a gear wheel 26 and internal gear ring 27. The speed at which the upper rotor 19-20, is driven may for example be 20 m/s at the circumference of the crop conveying skirt 19, but may in other cases be in the range 10 m/s to 40 m/s. As shown in FIG. 1 by the two arrows, both the knife carrying rim 18 and the crop conveying skirt 19 rotate in the same direction, namely towards the rear on the inner side of the cutting device 13 which faces towards the other cutting device (not shown). Thus in conventional manner the crop is gathered inwardly between the two cutting devices and transferred rearwardly to form a swath. Thus on the second cutting device (not shown) the rotating components revolve in the opposite direction so that the crop is conveyed to the rear through the central space between the adjacent devices.

FIG. 2 is a front view partly in cross-section of a modified form of the crop cutting apparatus of FIG. 1, and in this and other embodiments corresponding elements are indicated by like reference numerals. In this modification the bevel gears 14 and 25 are so arranged that the knife carrying rim 18 rotates in the opposite direction to the direction of rotation of the crop conveying skirt 19.

With regard to the gearing shown in FIGS. 1 and 2, it will be appreciated that alternative ways of achieving the differential drive may be provided, such as planetary gearing.

It is not essential that the cutting rotor rotates more quickly than the conveying and conditioning rotor. If a method is used which achieves the desired crop cutting at lower speeds than the lowest effective conditioning speeds of, say, 15 m/s, then the ratio of the speeds between cutting and conditioning components may be reversed.

FIG. 3 is a diagrammatic perspective view of the general layout of crop cutting apparatus embodying the invention in the form shown in FIG. 1 or FIG. 2, but with attachments 28 attached to the upper surfaces of the crop conveying skirts 19. The attachments 28 are support bars intended for mounting crop conveying and/or conditioning elements to be described and shown hereinafter. The two crop cutting devices are indicated generally at 13 and 13' and are shown as supported from an overhead frame 29 suitable for attachment to the three point linkage of a tractor.

FIGS. 4 and 5 are side and plan diagrammatic representations respectively of a modification of the crop cutting apparatus of the form shown in the preceding figures, and again corresponding elements are indicated by the like reference numerals. FIG. 4 shows the skid disc 16 at the base of the cutting device, and a disc 17 which carries the outer rim 18 and knives 21.

FIG. 4 shows how the knife carrying rim 18 is attached to the support disc 17 by means of spaced apart angled brackets 33. This method of construction ensures that any material which may enter through the gap between the knife carrying rim 18 and the crop conveying skirt 19 can leave again through the gaps between brackets 33 under the influence of centrifugal forces. The plan view in FIG. 5 shows how the pivoted knives 21 can rotate through 360°, between the brackets 33.

FIGS. 6 and 6(a) are diagrammatic side and plan views respectively of a further modification of the crop cutting apparatus shown in the preceding figures, in which the lower support disc 17 consists of a dished pressing from which smaller discs have been cut as indicated at 17' to save weight. To provide locating and mounting means for the knives 21, part-moon shaped plates 18' are welded to an upstanding rim 17" which is also recessed at the top to allow each knife to swing through a full 360°, on impact with a heavy object. In this modification, the projections 18' fulfill a similar function to the rim 18 in the preceding figures, and as shown in FIG. 6, the shape of each projection 18' is such as to continue the shape of the upper surface of the crop conveying skirt 19. In a modified version shown in FIGS. 7 and 7(a), each plate is in the form of a ramp acting to lift cut crop towards the conveying surface 19 of the upper rotor.

Although it is preferred that the knives 21 are mounted beneath the projections 18', or the rim 18, it is to be appreciated that the knives could be mounted on top of the projections 18' or rim 18. Furthermore, the knives could be fixedly or semi-rigidly mounted without pivoting.

The embodiments of FIGS. 6 and 7 give the advantage that the overlap zone between two adjacent, counter rotating and synchronously driven cutting units can be made greater than is possible with plain disc units. As a result the "mane" of long stubble so often left in difficult crops and conditions by rotary mowers is avoided.

It should be understood that the shape of the ramp-like protrusions in FIGS. 6, 6(a), 7 and 7(a) can be varied; the most preferred shape is the leading half of a part-moon, as in FIG. 7(a).

Figure 7B:
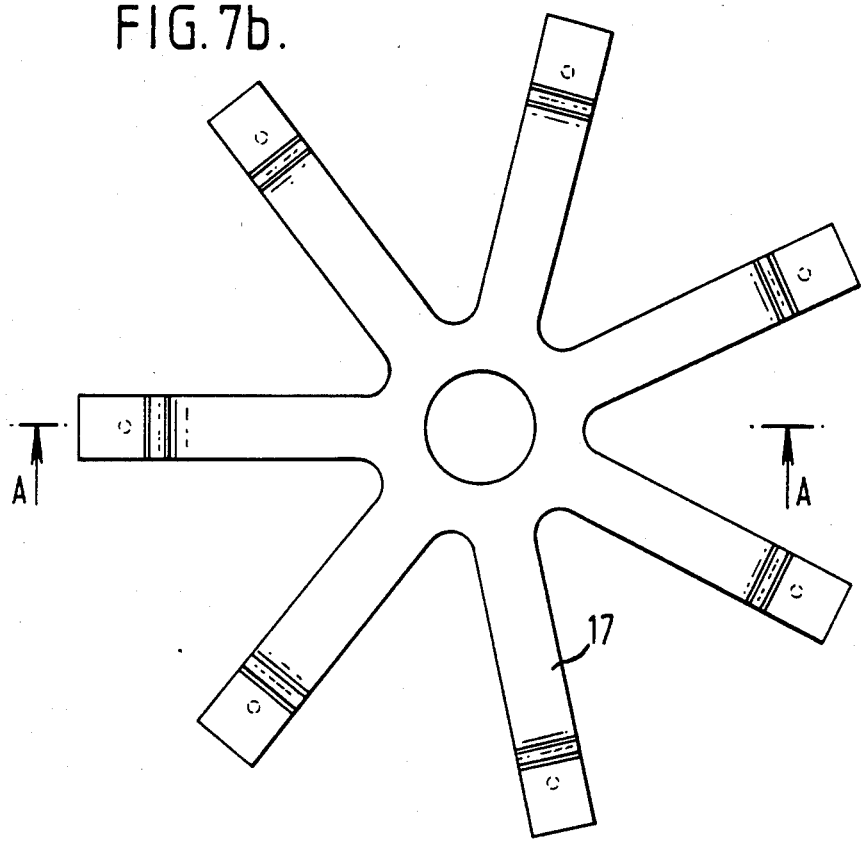
Figure 7C:
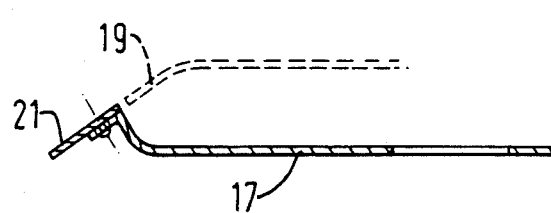

In FIG. 7(b) there is shown in plan view an alternative form of the rotor 17 for supporting the knives 21, although in FIG. 7(b) the knives are omitted. FIG. 7(c) is a cross-section along the lines A—A in FIG. 7(b), and shows one of the knives 21, and also the relationship of the rotor 17 to the conveying rotor surface 19. Thus in general it will be appreciated that the cutting knives can be attached to upturned or downturned spoke-like extensions of a lower rotor of small centre diameter, in such a way that the upper surface of each knife lies approximately in the continuation plane of the crop conveying surface of the upper rotor.

FIGS. 8 and 8(a) show a side cross-section and plan view respectively of an apparatus embodying the present invention and suitable for use in connection with the crop cutting apparatus shown in the preceding figures. FIG. 8 shows a wiper device 34 in the form of a tuft of resilient crop conditioning elements (also referred to as filaments) 35 formed of synthetic plastics material. The tuft 34 is bolted onto the crop conveying skirt 19 in such a way that it is supported on two sides by a shallow bracket 36 to prevent the tuft from turning under the influence of centrifugal force or load applied to its tip. In the plan view FIG. 8(a), the tuft 34 is shown to be orientated in such a way that, relative to a radius of the crop conveying skirt 19, the tips of the elements 35 are trailing. It is also shown that the elements 35 overhang the knife carrying rim 18 and may extend over the cutting path of the cutting knives 21. The number of wiping tufts 34 fitted near the perimeter of the crop conveying skirt 19 may varied from two per disc to several times the number of cutting knives.

The wiper element of FIGS. 8 and 8(a) overhanging the cutting rim is not primarily for conditioning the crop; it also serves the purpose of engaging, lifting or assisting crop on to the conveying skirt and prevents repeated contact of crops with the cutting knives. Optionally it can intrude into the cutting zone. The degree of resilience and its construction can vary.

FIG. 9 is a diagrammatic side view of a crop cutting and conditioning apparatus embodying the invention and is particularly concerned with a linear array 37 of crop conditioning elements 35 which are provided on the crop conveying skirt 19 of a crop cutting and conditioning device 13. FIG. 9 shows a knife carrying rim 18 of the form described with reference to the previous figures, and also shows a tuft 34 protruding out over the rim 18. The rim wiping tuft 34 is shown to be followed by an attachment to the crop conveying skirt 19 which consists of a rear-wardly leaning bracket plate 38 to which are attached on the upwardly inclined trailing face thereof a series of tufts 39 of synthetic plastics conditioning elements 35 similar to the elements described with reference to FIG. 8(a). The conditioning elements of the embodiments described with reference to FIG. 8 onwards of the present description may conveniently be of any of the forms described in published pending PCT Application No. PCT/TB79/00053-Publication No. WO79/00863. It is an object of the attachment shown in FIG. 9 as a whole to drive itself under the cut crop, forcing the crop upwards so that it is scratched and abraded by the tufts of plastics material during acceleration. To maintain the drum unit of the cutting device 13 in balance in operation, two attachments 38 are normally required, although alternatively a counter-weight may be fitted on the opposite side of the crop conveying skirt 19 and this may be appropriate on a relatively small diameter cutting device. Preferably the multi tuft attachment 37 is fitted at an angle to a radius of the vertical axis of the cutting device 13 so that the outer end of the attachment 37 leads the radius. The angle which the attachment 38 makes with a radius of the vertical axis of the cutting device 13 (when viewed from above) determines whether the crop is scattered at the rear of the mower or whether it is formed into a distinct swath. In FIG. 9 the inclination of the crop conveying skirt 19 has been accentuated by the base of the attachment 38 being tapered down towards the rim. This configuration makes it more difficult for the crop to move towards the centre of the crop conveying skirt 19, and conditioning is largely confined to the lower crop regions.

FIGS. 10 and 10(a) are diagrammatic perspective views of a further embodiment of a crop conditioning device embodying the invention, in this case where conditioning elements are provided on bars 43 positioned to extend between the outer edge of the conveying skirts 19, and the upper part of the drum 20. The bars are arranged in the general form of a conical "squirrel cage" arrangement, and represent a further movement of the conditioning elements from the positions shown in FIG. 9, so as to be lying at an even steeper angle to the plane of the conveying skirt. The conditioning bars are so fitted that they connect the upper surface of the crop conveying skirt 19 with the underside of an upper sealing ring 44 attached to the top of the drum 20. In FIG. 10, brush tufts 45 are shown set substantially horizontally, whilst in FIG. 11, which shows a modification, the tufts 45 are inclined downwardly in the outward direction. In FIGS. 10 & 11 the lower parts of the bars lead the upper parts, relative to the rotation of the rotors, forming a helical arrangement in order to give a lifting effect to the crop.

The crop conditioning unit need not necessarily be of open cage construction, but can consist of a solid cone or drum to which fins for mounting the conditioning elements can be attached.

A further alternative embodiment of the invention will now be described with reference to FIG. 12 which shows a perspective view of the general layout of a crop cutting and conveying apparatus embodying the present invention. Many of the components of the apparatus shown in FIG. 12 are in common with the structures shown in FIGS. 1, and 1(a), and like reference numerals are used for like elements. The description of FIG. 12 should be read in conjunction with FIGS. 1, and 1(a).

The apparatus comprises a crop cutting and conveying apparatus having two cutting units indicated generally at 108 and 109, each comprising a main central drum 20 suspended from a cross beam 29, and each having a dish shaped outwardly sloping skirt 19 and dish shaped ground skid 16. Cutting knives 21 protrude outwardly from a separate disc 17 between the skirt 19 and the ground skid 16, so that in general terms the two drums 108 and 109 resemble conventional drum cutting units.

Mounted on each of the cutter units is a plurality of crop engaging elements 110, embodying this aspect of the present invention. Each crop engaging element 110 comprises a generally crescent-shaped, flat, rib-like member of stiff resilient synthetic plastics material, for example 9 m.m. thick, which is secured to the drum cutter by being bolted to support bars 130 which in turn are secured between the skirt 19 and an upper support structure 131. Outwardly projecting bars 132 form part of the support structure 131 to which a support bar 130 is bolted. Each support bar 130 is inclined at a skew angle to the axis of rotation of the drum 20, and an outwardly facing edge 133 of the crop engaging element 110 is generally curved in a crescent shape. The effect of this inclination of each crop engaging element 110 is that the outer edges of the elements provide a general configuration of a number of part helixes around the drum 20. The drive means for the drum [as described hereinbefore with reference to FIG. 1] is arranged to drive the rotors in rotation in a sense such that the lower edge of each helix is leading, so as to impart a lifting action to the crop.

Preferably the outer edge of each crop engaging element 10 is serrated as at 134 to assist in the crop engaging action but the outer edges may be smooth or scalloped.

Attachment of the elements 10 may be to mounting bars or fins by bolts carrying optionally coil spring spacers, to make provision for greater deflection than can normally occur when a heavy object is accidentally picked up with the crop and makes contact, perhaps repeatedly, with one or more ribs.

The speed at which the main rotor 20 is driven may for example be 20 m/s at the circumference of the crop conveying skirt 19, but may in other cases be in the range 10 m/s to 40 m/s. This speed is arranged to be slower than the speed of rotation of the cutting knives 21, which are rotated at a conventional cutting speed. Both the knife carrying disc 17 and the crop conveying skirt 19 on the rotor 108 rotate in the same direction, namely towards the rear on the inner side of each cutting device, so that in conventional manner the crop is gathered inwardly between the two cutting devices and transferred rearwardly to form a swath. Thus on the second cutting device 109, the rotating components revolve in the opposite direction so that cut crop is conveyed to the rear through the central space between the adjacent cutting devices.

In operation the arrangements by which the planes of the crop conveying elements 110 are helically inclined to the vertical rotary axis has the effect of an auger which enters under any crop which overhangs the front of the cutting unit and lifts the crop, sometimes even before the crop is cut by the knives 121. The crop engaging elements 110 act like a screw thread driven under the crop and impart a lifting force to the crop. Conveniently at the same time the crop engaging elements 110 are arranged to condition the crop so as to deliver a formed swath which is also conditioned for crop drying.

The crop engaging elements 110 can be attached to their mounting bars 130 rigidly, so that deflection arises from the nature of the material of the elements themselves, or conveniently the elements can be attached using coil spring washers in the securing bolts. In such a case the rib like members can readily deflect upwards or downwards more easily and by a greater extent than would be possible for rigidly attached elements.

Advantages which may be obtained from embodiments of the invention include the following. There may be provided a particularly compact mower conditioner. Due to the forward motion of the machine, cut crop is conditioned immediately in a thin layer. Laid crops may be lifted effectively at the front and protected to some extent against multiple cutting. The crop is augered upwards, lifted over the knives at the rear, and deposited in a very fluffy swath. The smooth edges of the crop engaging rib like members at the bottom and top minimise power requirements and damage to the susceptible upper crop parts respectively. The unit shown in the Figures is also suitable for front mounting purposes on a drive unit such as a tractor, but is shown in FIG. 10(a) side mounted on a tractor.

In accordance with a particularly preferred feature, the outer edges of the elements 110 are extended beyond the outer perimeter of the cutting paths of the knives 21, and the elements 110 of the two rotors 108 and 109 are arranged to overlap and intermesh in the region between the rotors, in the manner of two gear wheels. This provides particularly effective conditioning of the crop. If additionally the knife carrying discs 17 are driven in counter-rotation, cutting of the crop is achieved at least in part by shear.

I claim:

1. Crop engaging apparatus comprising:
   a mobile frame for movement over the ground,
   at least one crop engaging rotor for conditioning and conveying cut crop, and
   drive means for rotating said rotor about a vertical axis, or near vertical axis, for conditioning cut crop and conveying the crop towards the rear of the machine,
   the rotor comprising a brush-like structure having a multiplicity of stiff, resilient, outwardly directed, elongate crop engaging elements, crop engaging being arranged in a plurality of part helical arrays distributed around the rotor axis, each said array occupying only part of the circumference of said rotor, and each said array leading upwardly and rearwardly relative to the intended direction of rotation of said rotor so as to exert a lifting action on crop engaged by the rotor,
   each said array comprising a lower part close to the ground, and an upper part which is spaced from the ground, crop engaging protruding outwardly from said rotor axis both at said lower part of said array and at said upper part of said array, the distal ends of crop engaging forming an outer envelope of said rotor over a substantial proportion of the height of said rotor so that said distal ends of crop engaging exert a conditioning action on the crop.

2. Apparatus according to claim 1 in which the elements are arranged in spaced-apart tufts of elements.

3. Crop engaging apparatus comprising:
   a mobile frame for movement over the ground,
   at least one crop engaging rotor for conditioning and conveying cut crop, and
   drive means for rotating said rotor about a vertical axis, or near vertical axis, for conditioning cut crop and conveying the crop towards the rear of the machine,
   said rotor comprising a plurality of crop engaging elements extending outwardly from said rotor axis and distributed around said rotor axis, each said element occupying only part of the circumference of said rotor, and said plurality of elements being greater than two, each element comprising a generally flat sheet-like member, said member having an outwardly facing edge for engaging crop, each said element terminating in another crop engaging edge leading upwardly and rearwardly relative to the intended direction of rotation of said rotor so as to exert a lifting action on crop engaged by the rotor, said outer edges being inclined upwardly and rearwardly over at least a major proportion of the height of the crop engaging region of the rotor, each said outer crop engaging edge comprising a lower part close to the ground, and an upper part which is spaced from the ground, said outer edge of each element protruding outwardly from said rotor axis both at said lower part of said edge and at said upper part of said edge, said outer edges of said elements forming an outer envelope of said rotor over a substantial proportion of the height of said rotor so that said outer edges exert a conditioning action on the crop.

4. Apparatus according to claim 3 in which there is provided in association with the crop engaging rotor, a rotary cutting means mounted for rotation about the same axis as the crop engaging rotor, and arranged to be driven by the drive means for cutting crop by rotary motion during movement of the frame over the ground, the associated crop engaging rotor being arranged to lift and convey rearwardly crop cut by the cutting means.

5. Apparatus according to claim 4 in which said drive means is arranged to drive said rotary cutting means at a different angular velocity from its associated crop engaging rotor.

6. Apparatus according to claim 4 in which the elements of the rotor extend outwardly beyond of the outer perimeter of the cutting path of the cutting means.

7. Apparatus according to claim 3 in which there are provided two crop engaging rotors having the features set out in claim 3, each rotor being mounted for rotation about a vertical or near vertical axis with the axes spaced apart transversely relative to an intended direction of forward travel of the apparatus, and the drive means being arranged to drive the rotors in counter rotation in such a manner that crop is passed between the rotors upwardly and rearwardly from the front to the rear of the apparatus.

8. Apparatus according to claim 7 in which the outer peripheries of the two crop engaging rotors overlap, in which the drive means is arranged to rotate the two crop engaging rotors in counter rotation at the same rate of rotation, and in which the crop engaging elements are so arranged that in operation the outer edges of elements of one rotor intermesh with spaces between the outer edges of elements on the other rotor during rotation.

9. Apparatus according to claim 3 in which there are provided two or more crop engaging rotors having the features set out in claim 3, each rotor being mounted for rotation about a vertical or near vertical axis with the axes spaced apart transversely relative to an intended direction of forward travel of the apparatus, and the drive means being arranged to drive each rotor in rotation in the same sense in such a manner that crop is swept across the combined front of the rotors into a windrow on one or other side of the apparatus.

10. Apparatus according to claim 3 in which the general outline of the outer edge of each element is straight.

11. Apparatus according to claim 3 in which the general outline of the outer edge of each elements is curved.

12. Apparatus according to claim 3 in which each succeeding element around the periphery of the rotor is overlapped by the immediately preceding element, each element having an upper portion which extends over a lower portion of an immediately succeeding element.

13. Apparatus according to claim 3 in which the envelope of the outer edges of the elements of the rotor is substantially cylindrical.

14. Apparatus according to claim 3 in which the envelope of the outer edges of the elements of the rotor is at least part conical.

15. Crop engaging apparatus comprising:

a mobile frame for movement over the ground, at least one crop engaging rotor for conditioning and conveying cut crop, and drive means for rotating said rotor about a vertical axis, or near vertical axis, for conditioning cut crop and conveying the crop towards the rear of the machine, said rotor comprising a plurality of crop engaging elements extending outwardly from said rotor axis and distributed around said rotor axis, each said element occupying only part of the circumference of said rotor, and said plurality of elements being greater than two, each element comprising a generally flat sheet-like member, said member having an outwardly facing edge for engaging crop, each said member being formed of thick stiff resilient sheet-like material, each succeeding element around the periphery of the rotor being overlapped by the immediately preceding element, each element having an upper portion which extends over a lower portion of an immediately succeeding element, each said element terminating in an outer crop engaging edge leading upwardly and rearwardly relative to the intended direction of rotation of said rotor so as to exert a lifting action on crop engaged by the rotor, said outer edges being inclined upwardly and rearwardly over at least a major proportion of the height of the crop engaging region of the rotor, each said outer crop engaging edge comprising a lower part close to the ground, and an upper part which is spaced from the ground, said outer edge of each element protruding outwardly from said rotor axis both at said lower part of said edge and at said upper part of said edge, said outer edges of said elements forming an outer envelope of said rotor over a substantial proportion of the height of said rotor so that said outer edges exert a conditioning action on the crop.

16. Crop engaging apparatus comrising:

a mobile frame for movement over the ground, at least one crop engaging rotor for conditioning and conveying cut crop, and drive means for rotating said rotor about a vertical axis, or near vertical axis, for conditioning cut crop and conveying the crop towards the rear of the machine, said rotor comprising a plurality of crop engaging elements extending outwardly from said rotor axis and distributed around said rotor axis, each said element occupying only part of the circumference of said rotor, and said plurality of elements being greater than two, each element comprising a generally flat sheet or rib-like member, said member having an outwardly facing edge for engaging crop, each said element terminating in an outer crop engaging edge leading upwardly and rearwardly relative to the intended direction of rotation of said rotor so as to exert a lifting action on crop engaged by the rotor, said outer edges being inclined upwardly and rearwardly over at least a major proportion of the height of the crop engaging region of the rotor, each said outer crop engaging edge comprising a lower part close to the ground, and an upper part which is spaced from the ground, said outer edge of each element protruding outwardly from said rotor axis both at said lower part of said edge and at said upper part of said edge, said outer edges of said elements forming an outer envelope of said rotor over a substantial proportion of the height of said rotor so that said outer edges exert a conditioning action of the crop.

17. Apparatus according to claim 16 in which the crop engaging elements are formed by a plurality of wide, generally flat rib-like members spaced from and distributed around the axis of the rotor, each rib-like member having a side edge facing outwardly from the axis for engaging crop, and each rib-like member having a general longitudinal axis which is inclined at a skew angle to the axis of the rotor.

18. Apparatus according to claim 17 in which each rib-like member has a generally crescent-shaped form, the outer edge of the rib being of curved shape.

19. Crop engaging apparatus comprising:
a mobile frame for movement over the ground,
at least one crop engaging rotor for conditioning and conveying cut crop, and
drive means for rotating said rotor about a vertical axis, or near vertical axis, for conditioning cut crop and conveying the crop towards the rear of the machine,
said rotor comprising a plurality of crop engaging elements extending outwardly from said rotor axis and distributed around said rotor axis, each said element occupying only part of the circumference of said rotor, and said plurality of elements being greater than two, each element comprising a generally flat sheet-like member, said member having an outwardly facing edge for engaging crop, each said element terminating in an outer crop engaging edge leading upwardly and rearwardly relative to the intended direction of rotation of said rotor so as to exert a lifting action on crop engaged by the rotor, said outer edges being inclined upwardly and rearwardly over at least a major proportion of the height of the crop engaging region of the rotor,
each said outer crop engaging edge comprising a lower part close to the ground, and an upper part which is spaced from the ground, said outer edge of each element protruding outwardly from said rotor axis both at said lower part of said edge and at said upper part of said edge, said outer edges of said elements forming an outer envelope of said rotor over a substantial proportion of the height of said rotor so that said outer edges exert a conditioning action on the crop, and
a rotary cutting means mounted for rotation about the same axis as said crop engaging rotor, said cutting means being driven by said drive means for cutting crop by rotary motion during movement of said frame over the ground, and said associated crop engaging rotor being arranged to lift and convey rearwardly crop cut by the cutting means, said drive means being arranged to drive said cutting means at a different angular velocity from said crop engaging rotor.

20. A method of conditioning and conveying crop comprising the steps of:
rotating about a vertical or near vertical axis a crop engaging rotor mounted on a mobile frame for movement over the ground, and
conditioning crop and conveying crop towards the rear of the frame by rotation of said rotor,
said conditioning and conveying step comprising acting on the crop by a plurality of crop engaging elements extending outwardly from said rotor axis and distributed around said rotor axis, each said element occupying only part of the circumference of said rotor, and said plurality of elements being greater than two, each element comprising a generally flat sheet-like member, said member having an outwardly facing edge for engaging crop, each said element terminating in an outer crop engaging edge leading upwardly and rearwardly relative to the intended direction of rotation of said rotor so as to exert a lifting action on crop engaged by the rotor,
said conditioning step comprising conditioning the crop by said outer edge of each said element, which is arranged to protrude outwardly from the rotor axis both at a lower part of said element close to the ground and at upper part of said element which is spaced from the ground, whereby said conditioning is effected by said outer edges of said elements of the rotor over a substantial proportion of the height of said rotor, and
said conveying being effected by each said element which leads upwardly and rearwardly relative to the intended direction of rotation of said rotor so as to exert a lifting action on the crop, said outer edges being inclined upwardly and rearwardly over at least a major proportion of the height of the crop engaging region of the rotor.

21. A method according to claim 20 including the steps of cutting crop by rotation of a rotary cutting means mounted coaxially with the crop engaging rotor, and conveying and conditioning the cut crop by the action of the crop engaging rotor.

22. A method according to claim 21 including the step or rotating the rotary cutting means and the crop engaging rotor at different angular velocities.

23. A method according to claim 20 including the steps of rotating two crop engaging rotors about respective vertical or near vertical axes which are spaced apart transversely relative to forward motion of the rotors, and rotating the two rotors in counter rotation in such a manner that crop is passed between the rotors upwardly and rearwardly from the front to the rear of the apparatus by a conveying action of both rotors.

* * * * *

UNITED STATES PATENT AND TRADEMARK OFFICE
CERTIFICATE OF CORRECTION

PATENT NO. : 4,502,267

DATED : March 5, 1985

INVENTOR(S) : KLINNER, Wilfred E.

It is certified that error appears in the above-identified patent and that said Letters Patent is hereby corrected as shown below:

On the title page

Under Foreign Application Priority Data:

Please add the third priority date, which was omitted:
-- May 15, 1981 (GB) United Kingdom 8114981. --

Signed and Sealed this

Twenty-seventh Day of May 1986

[SEAL]

Attest:

DONALD J. QUIGG

Attesting Officer

Commissioner of Patents and Trademarks